No. 148. REISSUED OCT. 9, 1849.
J. THURSTON.
WINNOWING MACHINE.
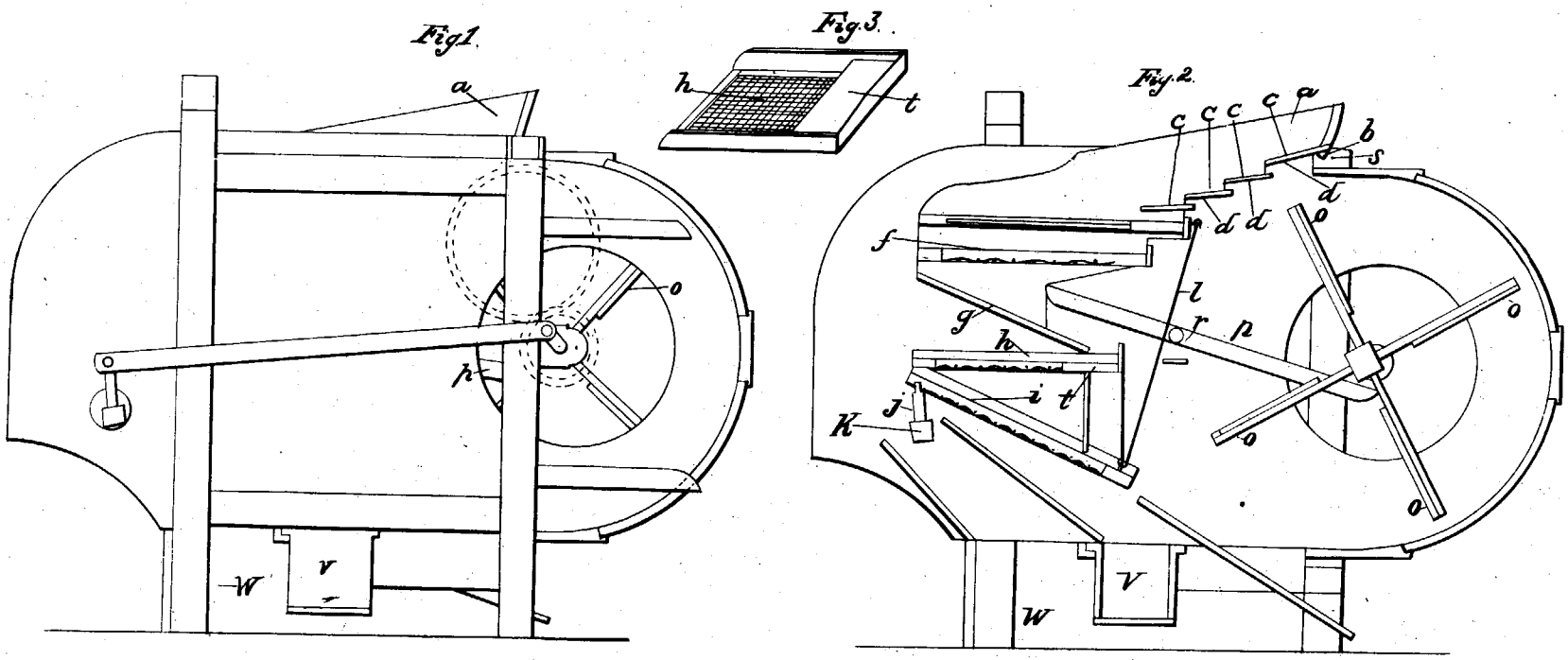
THE NATIONAL PETERS CO., PHOTO-LITHO. WASHINGTON, D.C.

UNITED STATES PATENT OFFICE.

JOHN THURSTON, OF BATH TOWNSHIP, FRANKLIN COUNTY, INDIANA.

IMPROVEMENT IN WINNOWING-MACHINES.

Specification forming part of Letters Patent No. 5,410, dated January 6, 1848; Reissue No. 148, dated October 9, 1849.

*To all whom it may concern:*

Be it known that I, JOHN THURSTON, of the township of Bath, Franklin county, Indiana, have invented new and useful Improvements in Winnowing-Machines for Separating the Wheat from the Cheat, Chaff, Caps, &c.; and I do hereby declare the following to be a full, clear, and exact description of the same, reference being had to the annexed drawings, making part of this specification, in which—

Figure 1 is a side elevation, and Fig. 2 a longitudinal section, thereof. Fig. 3 is a perspective view of the separating-riddle and shelf.

The same letters indicate similar parts in both figures.

The nature of the first division of my invention consists in constructing the feeder with three or more successive slats or steps, each at an angle of about twenty degrees, and having a free passage between each slat forming the same for the escape of a portion of the blast of air caused by the fan, and in arranging and combining therewith, for the purpose desired, the parts attached to this slat feeder.

Grain in the chaff, when the whole is put in motion together, has a tendency to undergo the felting process in a crude way. The great objects to be attained in winnowing-machines are to prevent this process, and while getting rid of the remnants of straw, chaff, caps, &c., to obviate its interference therewith or impediment thereto. This first part of my invention supplies the remedy so long needed, and by it I pass a portion of the blast through the load on the feeder as it is shaken down from step to step by a vertical motion, to be presently described. This feed-blast lightens and separates the grain and chaff, &c., by diffusing itself through them, and thus accelerates and increases the quantum of feed supplied to the riddles, and in such condition, too, as enables the remainder of or the cleansing-blast, in conjunction with the motions given to the series of riddles, &c., to do a greater amount of duty, the machine, in consequence of this division of the blast, not being liable to choke. The feed passes through a rake previous to reaching the chaff-riddle, beneath which riddle I place an apron at such an angle as to give that portion of the cleansing-blast which passes up through the chaff-riddle a proper direction for raising the light stuff above the pure grain. By this means I get pretty well rid of chaff, ears, caps, straw, dust, and all matters light enough to pass off with them. The slat feeder, rake, chaff-riddle, and apron are all attached to the same cheeks, rest on pins that project up from the cross-piece that binds the fan-casing, or are fastened by hinges to this same cross-piece, and derive a vertical motion from levers bearing up against the lower edge of the cheeks, which levers have their fulcra suitably located in the planking of the frame of the machine, and are operated by the square fan-shaft. This apron above mentioned is further intended for gathering the grain and light and heavy cheat upon a second feeder or shelf.

The nature of the second division of my invention consists in constructing the separating-riddle with a regathering and refeeding shelf.

It has hitherto been supposed that gravity alone, aided by a properly-directed blast of air, was adequate to the complete separation of pure or merchantable grain from the cheat, ears, chaff, caps, straw, dust, &c., that are fed in with it to the winnowing-machine. Confining the operation of cleansing grain within a winnowing-machine of reasonable limits, this is only in part true. Something more is required. Practical experience of many years has taught me that a second gathering of the matter passed through the chaff-riddle, and a refeeding of the same, is of obvious utility in operating the second separating-riddle when the motions and the blast combined therewith are judiciously and properly applied, and that gravity and size, in conjunction with the remainder of the blast, may be confidently relied on for the rest of the operation—that is, for separating the remnant of the light cheat from the heavy and the heavy cheat from the pure grain. To attain these ends I construct the separating-riddle with a regathering and refeeding shelf the floor of which passes in front beyond the foot of the aforementioned apron. The load, guided down by the apron, is discharged on this shelf, and the separating-riddle being subjected to two motions—an undulating and longitudinal motion and a vertical motion—both to be presently described, the lighter components of the load in reciprocal proportion each to each of their gravity are raised above the heavy grain, so that when jolted upon and passed to the meshes of the separating-riddle the heavy and pure grain must first drip through upon the screen and roll down behind the machine. Without the regathering-apron aforesaid one motion is nearly as good as another. The blast, which, by inspection of the drawings it will be seen must pass up through the separating-riddle, will distribute the lighter substances, according to their respective weight, along toward and near and partly over the front end of the separating-riddle, and all that is not blown over will drop through and be carried by the blast along the upper portion of the screen. While this is going on, the jolt aforementioned is being continually imparted to the separating-riddle *h*, as follows: A screen is firmly attached by cheeks or otherwise to the separating-riddle *h*, and at an angle of about twenty-two degrees. The back part of this screen is also connected in any suitable way to the first-mentioned or slat feeder. It will be recollected that I have already described the means by which I give a vertical motion to the slat feeder. The separating-riddle and screen being attached by their rear end to the slat feeder they of course receive the same vertical motion. Conjointly with the vertical motion, the separating-riddle and screen receive from beneath their front ends an undulatory and longitudinal motion from a rock-shaft operating by means of a radius or arm or slat projecting upward therefrom equal to a sweep of an inch and a half (more or less) lengthwise of the machine. A suitable crank on the fan-shaft operates the rock-shaft by means of an ordinary connecting-rod. The grain and cheat, &c., having reached the screen in the manner and according to the distribution aforesaid, these motions have a tendency to arrange the grain and cheat in their length lengthwise of the machine, the meshes of the screen being similarly arranged. The grain not only dropping thereon first, but being too large to pass through the meshes of the screen, by virtue of the undulatory and longitudinal, and also the vertical motions and by gravity, passes off to the back of the machine down an apron contiuous with the screen; but the cheat, not being too broad to pass through the meshes of the screen, and by virtue of the undulating and longitudinal motions placed in their length lengthwise of the meshes of the screen, by virtue of the vertical motion is jerked and jolted down through the screen and drops into a suitable division or receptacle therefor. In front again of thisdivision there is another, for the purpose of receiving the lightest cheat, whether it may have dropped therein after being blown over the front ends of the chaff or the separating-riddles or have dropped through the front meshes of the screen.

The general form of my machine is similar to others now in use. *a* is the feeder, hung at its rear end on stationary pins *b* or on hinges; *c*, the slats in the bottom of the feeder, with openings *d* between them; *e*, the rake; *f*, the chaff-riddle, inclining slightly downward toward the back end. The rake and riddle are of ordinary construction. *g* is the gathering-apron; *t*, the second shelf, (see Fig. 3,) placed and fixed on the rear end of the separating-riddle *h*, to which the screen *i* is permanently attached, with its meshes in the length lengthwise of the machine. The screen inclines backward to an apron, *u*, which, similarly positioned, conducts the clean grain behind the mill. The triangular space between the separating-riddle and screen should be inclosed with canvas or wooden cheeks, in order to prevent any misdirection of the grain or cheat out of its proper channel. The separating-riddle and screen are hung on pins *j* at their front end, or other analagous device, projecting up from a rock-shaft, *k*, which extends out, so as by means of an arm to be connected with and operated by a crank, *n*, on the fan-shaft, through a rod, *m*. By one or more strong wires, *l*, placed at the rear end of the screen and connected with the feeder *a* by a hook or otherwise, the rear ends of the lower or separating-riddle and screen receive a vertical motion corresponding to that given to the feeder, conjointly with which they receive an undulating longitudinal motion by means of the rock-shaft *k* and pins *j*. *o'* is the fan. The vertical motion of the feeder and chaff-riddle is produced by the levers *p*, whose fulcra are at *r*. *s* is the cross-piece to which the feeder *a* is hung; *v* the division into which the heavy cheat falls, and *w* the receptacle for the light cheat.

The machine is set in motion by the usual means and in the usual way.

Having thus fully described the nature, construction and operation of my invention, what I claim therein as new, and desire to secure by Letters Patent, is—

1. Forming the feeder with slats, one below the other, in its bottom, and openings between them, the whole being made in this or any equivalent way, for the purpose described.

2. The shelf *t*, for regathering and refeeding the grain and cheat, and the separating-riddle, for the purpose described.

3. The separating-riddle *h* and screen *i*, a rear vertical motion, in the manner and for the purpose described, whether the motion be given to each separately or conjointly.

JOHN THURSTON.

Witnesses:
THOS. G. CLINTON,
EDWD. H. KNIGHT.